March 10, 1964 W. A. WACKER 3,123,857
PLASTIC MOLDING APPARATUS AND METHOD
Filed Feb. 1, 1960 3 Sheets-Sheet 3
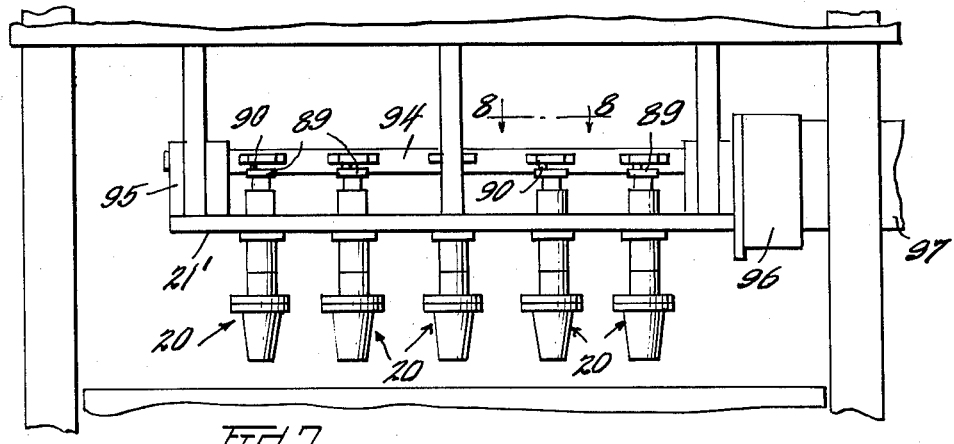
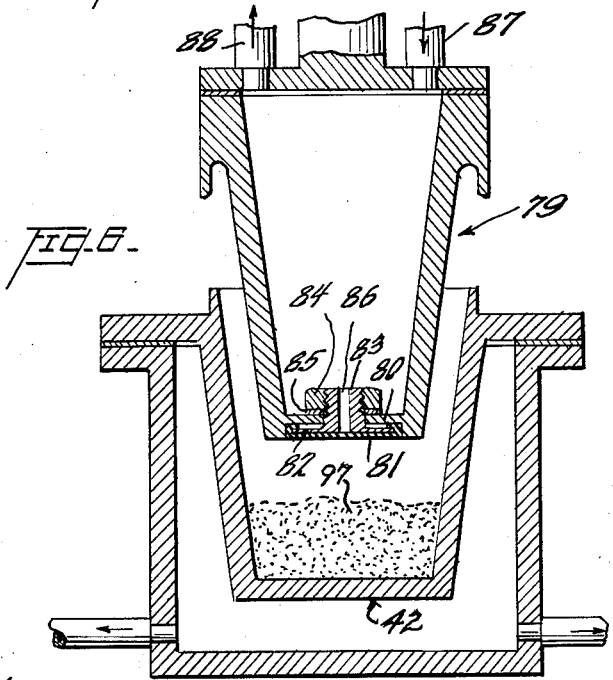
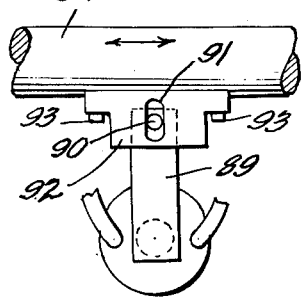
INVENTOR
William A. Wacker,
BY Parker and Welch
ATTORNEYS

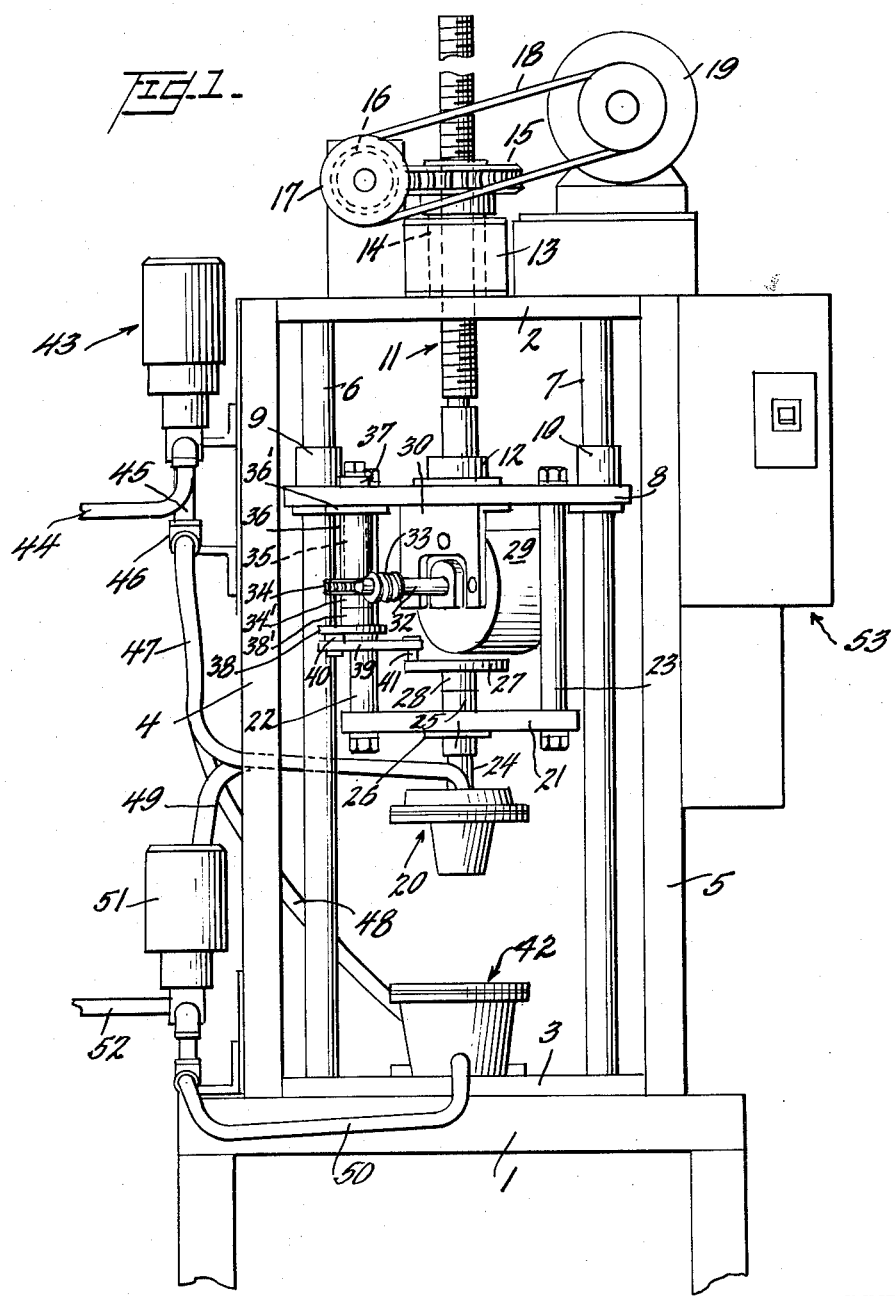

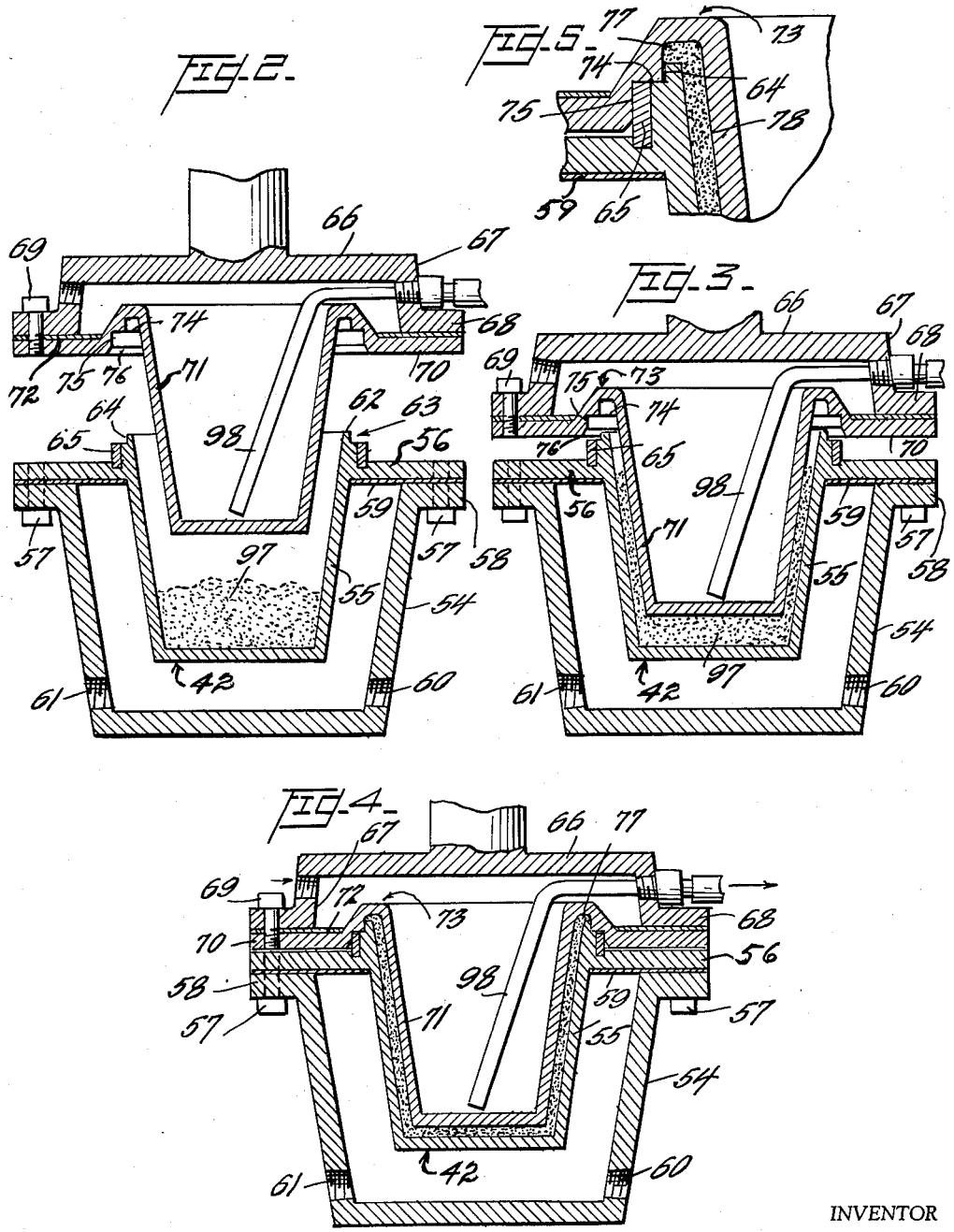

3,123,857
PLASTIC MOLDING APPARATUS AND METHOD
William A. Wacker, Mobile, Ala., assignor to The Stellar Corporation, Mobile, Ala., a corporation of Alabama
Filed Feb. 1, 1960, Ser. No. 5,791
6 Claims. (Cl. 18—5)

This invention relates to the molding of articles from plastic materials, and has particular reference to that type of operation wherein complementary dies are brought into juxtaposition to process a charge of granular or spherically formed base material. In this type of molding certain difficulties have persisted in respect of control of excess material and a lack of uniformity of conditions at the parting lines of the molds, with resultant variations in pressure conditions and in the quality of the end product. The response of the raw material in the mold to the applied pressure has also left much to be desired, and this is in some degree related to the first-mentioned problem.

It is therefore an object of the invention to improve the control of outflow and parting line conditions in molding operations. A further object is to achieve uniformity of final pressure conditions while minimizing ultimate pressures in molding operations. A related object is to facilitate flow and uniform distribution of raw material in molding operations.

Briefly stated, the foregoing objects are attained, in a general sense, by avoiding flash surfaces perpendicular to mold travel in favor of surfaces oriented preponderately in the sense of the direction of mold travel, and by providing for relative oscillation between the mold parts about an axis parallel to the line of travel of the movable mold part.

For a more specific description of the invention achieving the recited objects reference is made to the accompanying drawings, in which:

FIGURE 1 is a front elevational view of the essential parts of the molding apparatus;

FIGURE 2 is an axial, sectional view of the mating pair of mold members of FIGURE 1, greatly enlarged;

FIGURE 3 is a view similar to FIGURE 2 showing the closing operation of the mold at an advanced stage;

FIGURE 4 is a view similar to FIGURE 3 showing the parts at completion of the forming operation;

FIGURE 5 is a fragmentary view of a portion of FIGURE 4, further enlarged;

FIGURE 6 is an axial sectional view of a modified mold having a stripper device;

FIGURE 7 is a simplified, front-elevational view of a modified molding apparatus comprising mold sets in multiple; and FIGURE 8 is an enlarged view of a portion of FIGURE 7 taken on the line 8—8 of that figure.

Referring to the drawings by characters of reference there is shown, in FIGURE 1, a molding apparatus comprising a table or stand 1 supporting a mold assembly contained in a frame having top and base plates 2 and 3, respectively, and side uprights 4 and 5 which are preferably of channel section and screwed or otherwise secured to plates 2 and 3. A pair of vertical, cylindrical rods 6 and 7 fixed to plates 2 and 3 provide the guide means for the vertically movable mold component and its associated oscillating mechanism, the total movable subassembly being in the nature of a platen.

The main supporting structure in the platen consists of a crosshead 8 having upwardly extending bushings 9, 10 received on rods 6, 7 respectively for sliding movement. The platen unit depends from a threaded shaft 11 fixedly secured in a hub 12 carried by platen crosshead 8. Threaded shaft 11, in turn, is threaded through and depends from a housing 13 fixed to top plate 2 and in which is journalled a sleeve 14 held against axial movement, and with internal threads mating with those of shaft 11. Fixed to sleeve 14 is a worm gear 15 driven by a worm 16 through a pulley 17, belt 18 and motor 19, the parts being suitably mounted on platforms atop plate 2. It will be obvious that rotation of the motor 19 will effect vertical translation of the platen assembly.

The platen assembly, the prime purpose of which is to carry the movable mold component shown generally at 20, has a cage form in order to accomodate the apparatus which oscillates the mold member. Thus, mold unit or die 20 depends from a lower plate 21 secured by nuts to the lower ends of spacer rods 22, 23 depending from crosshead 8 of the platen. The upper mold component 20, to be described in greater detail hereinafter, has an upwardly extending, central shaft 24, journalled in a sleeve 25 carried by lower plate 21 and attached as by a flange 26, and fixed to the upper end of shaft 24 is a disc 27 having a hub 28 which dwells on the top of sleeve 25.

Oscillation of the mold component 20 is effected by an auxiliary power means coupled to the top disc 27 as follows: The drive motor 29 is secured to an angle bracket 30 fixed to and depending from the under side of crosshead 8 of the platen. Shaft 32 of the motor unit carries a worm 33 mating with a worm gear 34. The latter, through its hub 34' is keyed to a shaft 35 journalled in a sleeve 36, extending through and depending from crosshead 8, to the underside of which it is bolted through its flange 36'. A collar 37 forms a keeper for shaft 35. Also keyed to the lower end of shaft 35 is a disc 38 with hub 38'. A pitman link 39 pivoted eccentrically to disc 38 by a pin 40 and to upper disc 27 of the mold unit by a pin 41 connects the auxiliary motor system of the platen to the mold unit. Action of the motor 29 results in continuous rotation of disc 38 which actuates the link 39 but since pin 41 is radially more distant from its center of revolution than is pin 40, the disc 27 carrying the upper mold part does not make a complete revolution but is caused to oscillate. In practice, an amplitude of 30° in the die oscillation, and a frequency of 3½ strokes per second have been preferred, but these may be varied within relatively wide limits.

The lower, stationary die, the female component of the mold, indicated generally by the numeral 42, is fixed to the lower plate 3 of the framework of the apparatus. It will be readily apparent that operation of main motor 19 will cause the upper, male, mold component to descend to working position within the fixed female component, or the recede therefrom, and that at any preselected stage of descent of the male component it may be caused to oscillate by the auxiliary motor 29 to facilitate penetrating and distributing the raw material in the mold.

The mold components are heated and cooled at appropriate phases of the molding cycle by steam and water respectively. A valve, indicated generally by the numeral 43 controls flow of steam from a pipe 44 into a pipe 45 leading to a coupling 46 from which a flexible tube 47 leads to the upper mold part and a pipe 48 leads to the lower mold part. Outlet flexible tube 49 leads from the upper mold part and pipe 50 from the lower mold part to a valve 51 controlling outflow through a discharge pipe 52. Cooling water is introduced into pipe 45 as controlled by a suitable valve (not shown) similar to steam control valve 43.

A control system for cyclic operation, or programming, attached to the framework is indicated generally by the numeral 53.

For a detailed description of one modification of the mold components, reference is now made to FIGURES 2 to 4. The lower, female die 42 comprises a hollow-walled cup made up of an outer wall 54 and a spaced, inner wall 55 having an integral, horizontal flange 56 secured by bolts 57 to a flange 58 integral with the outer wall 54. Between the flanges is a suitable gasket material 59 for sealing steam and water in the chamber between the walls. Outer wall 54 has threaded openings 60, 61 for entry and discharge, respectively, of the steam or the water.

In conventional practice the top of the mold component would be a completely flat surface in the plane of the top of flange 56, with flashing, or outflow of excess material taking place in this plane. However, a highly important feature of the present invention resides in continuing the inner wall portion 55 upwardly an appreciable amount above the top of flange 56, and providing a complementary recessed form on the upper mold component, as will be seen, resulting in a structure which may be likened to a piston-cylinder arrangement. Thus, the inner wall 55 terminates in upper rim 62 which protrudes considerably above the top surface of flange 56. The outer portion of circular rim 62 is rabbeted or shouldered as at 63 for two highly significant reasons, namely, to provide a wall thickness at the rim defining the extent of the rim of the cup to be formed in the mold, and to provide a vertical parting line 64 for the two components of the mold. In order to facilitate the piston action, and especially the relative oscillation of the mold components, as well as to reduce wear, an antifriction ring 65 of Phosphor bronze or other suitable material is provided in surrounding relation to the extended upper portion of inner wall 55.

The upper mold component 20 has an inverted shallow cup portion 66 with a slant wall 67 and a horizontal flange 68 secured by screws 69 to the horizontal flange 70 of the male component proper, the latter having a slant wall 71 and a flat bottom similar to the inner wall 55 of the lower die and defining with inverted cup 66 a steam and water chamber made tight by a gasket 72. Wall portion 71 connects with horizontal flange 70 through an upwardly and downwardly looped portion 73 having on its under side a right angled corner 74 and a right angled recess 75. The vertical wall of corner 74, which defines a depending and enclosing skirt for the protruding rim of the female die, has a mating fit with the vertical wall 64 of rabbet 63 to a degree within the tolerance of outflow or flashing conditions at what constitutes the parting line. The lower, horizontal part of corner 74 closely approaches but does not necessarily dwell upon the horizontal part of rabbet 63 in the ultimate shaping position of the mold components. The vertical wall of recess 75 has a sliding fit with bronze ring 65 and is beveled as at 76 for guidance in bringing the mold parts into engagement, which function is especially desirable in gang molding wherein undue precision would otherwise be required in the design of the apparatus.

Conditions after final shaping are best observed in FIGURE 5. The underside of upwardly protruding, looped portion 73 of the male component proper defines the outwardly extending lip 77 of the cup 78 being formed from the raw material, and this lip is cleanly cut off by the piston-cylinder arrangement in a manner which is not only uniform in successive operations on a single mold but also in simultaneous operations during gang-molding. This elimination of the flashing problem by confining it to a vertical path and wherein the thickness of the flash, if any, is constant, has another highly important result in that it eliminates the need for sustained pressures after forming which have heretofore been necessary to cope with excessive and non-uniform flashing typical of horizontal parting lines. It follows that the need for close tolerances in design is materially reduced.

FIGURE 6 shows a modification wherein separation of the finished cup from the movable male die is accomplished by means of a flexible diaphragm. Male die 79 has a bottom wall 80 recessed on its underside to receive a rubber diaphragm 81. The diaphragm has a looped outer edge defining an internal, annular, peripheral channel receiving the outer edge of a keeper flange 82 having a threaded shank 83 extending through a central opening in die bottom 80 and securing the diaphragm in place, air-tight, by means of a nut 84 with washer 85. A central opening 86 in shank 84 provides fluid access to diaphragm 81. After final cure and separation of the dies, the application of pressure on the cooling fluid through inlet 87, with the valve of outlet 88 closed, will result in action by the fluid through orifice 86 distending diaphragm 81 downwardly, only a very slight movement being necessary to free the finished cup from the male die.

The movable die portion of a plural mold system is illustrated in FIGURE 7, wherein a movable platen has a lower plate or shelf 21' mounting a series of male dies 20 for oscillation in the same manner as in FIGURE 1. Since all the dies are identical only one need be described. The fixed shaft 24' of the die has a fixed horizontal arm 89 carrying a pin 90 at its outer end engaging a slot 91 in a lug 92 fixed by screws 93 to a cross rod 94 arranged for oscillating translation in the direction of its length. Cross arm 94, which is slidably received in a bearing block 95 carried by plate 21' is actuated by a standard, commercial transducer unit 96 which converts the rotary motion of a motor 97 to linear movement. Plate 21' may carry a plurality of rows of dies 20, and each row may have a motor 97 or the system may be provided with a single prime mover and suitable connections. It will be seen that the sliding action of cross rod 94 will cause oscillation of arms 89 in an arc with resultant rotary oscillation of dies 20. The slots 91 in lugs 92 afford clearance for the pins 90 as their distance from rod 94 varies in their circular movement.

In recapitulation, the molding cycle is described as follows, with respect to a single mold, as in FIGURE 1: With the mold dies separated, the molding material, such as small, foamable polystyrene beads 97 is charged into female die 42 by any suitable means, and preferably will be controlled by the automatic programmer 53. The platen system then descends carrying the male die into the female die. Just prior to contact with the heap of beads 97 motor 29 is actuated, resulting in oscillatory motion of the male die 20. As the die continues to descend, this oscillatory motion gives the beads, which are in effect spherical, a rolling action, and imparts a force to them, the resultant of which is an upward pushing force. This results in quick, efficient and complete filling of the mold cavity with absence of voids. During this action the vertically cylindrical mating surfaces of the dies, which have been likened herein to a piston and cylinder, with the assistance of beveled edges 76, come into mating engagement prior to the final position of the mold parts, with the result that any premature rise of the material in the lower die is trapped against escape and held while conditions are adjusted during final closure of the dies. At final closing the flashing, if any, is all in the vertical clearance between the dies where it offers no impedance, and the pressure on the dies may be released during the curing period with the assurance that a clean cut peripheral lip will result on the cup being formed.

With the dies closed, steam at 250° to 300° F. is introduced simultaneously into the interiors of the two dies, and heat is transferred through the inner walls of the dies by conduction to fuse the beads of material into the desired cup form. At the end of the curing or fusing period, the steam is evacuated and cooling water substituted in the die interiors. After cooling the water is evacuated in preparation for a renewal of the molding cycle, and to facilitate this evacuation, the outlet line of the male die includes a pipe 98 dipping downwardly to the bottom of the die. Upon retraction of the male die, any necessary stripping of the article therefrom may be effected by appropriate means, as for instance the flexible diaphragm 81 of FIGURE 6. The heating, cooling and stripping may all be controlled by the programmer unit 53.

While certain preferred forms of the invention have been shown and described, the invention should not be deemed as limited thereby since various other embodiments within the range of reasonable equivalents will be apparent to those skilled in the art in the light of this disclosure, and the invention should not, therefore, be deemed as being limited except as shall appear from the spirit and scope of the appended claims.

I claim:

1. A molding device comprising a pair of dies having complementary surfaces defining a mold cavity when the dies are in juxtaposed relation, and mating surfaces exteriorly of the common periphery of the complementary surfaces, said mating surfaces having a portion normal to the direction of approach of said dies and spaced from said common periphery the portions of said dies connecting said periphery and said mating surfaces, being formed as contacting cylindrical surfaces, the axis of said cylinders being parallel to the direction of approach and means for oscillating one of the die elements about the mold axis.

2. A molding device comprising a pair of dies having complementary surfaces defining a mold cavity when the dies are in juxtaposed relation, and mating surfaces exteriorly of the common periphery of said complementary surfaces, said mating surfaces having a portion spaced from said common periphery axially of the mold system and having a cylindrical portion connected with said periphery, parallel to the mold axis, and constituting the parting line of the mold and means for oscillating one of the die elements about the mold axis.

3. A molding device comprising a pair of dies having complementary surfaces defining a mold cavity when the dies are in juxtaposed relation, said dies having a cylindrical sliding fit parallel to the mold axis at the common periphery of said surfaces, and means to oscillate one of said dies in rotation about the mold axis during approach of said dies.

4. A molding device, for operation upon a flowable and compressible plastic, having relatively movable parts that close completely, requiring insertion of the plastic in the mold cavity before closure, comprising: a pair of main elements, male and female movable toward and away from each other to form a cup-shaped object, whereby, during the molding operation, the fluent plastic moves toward the rim of the mold cavity; a portion on the female die, adjacent the rim of the mold cavity protruding toward the male die, in the direction of approach; a portion on the male die adjacent the rim of the mold cavity enclosing said protrusion and mating therewith to close the mold cavity, said enclosing portion being arranged to reach enclosing position in advance of final mold closure; whereby the terminal portion of the closing operation acts to compress that portion of the plastic forming the rim of the molded object.

5. A method of molding, employing a pair of dies which jointly define an article of revolution of cup shape, which comprises mounting the dies for movement toward and away from each other along the axis of revolution, at least one of said dies being also mounted for oscillating movement about the axis of revolution and supplying the molding material to the mold cavity in loose, particulate form while advancing the dies toward each other and oscillating the oscillatable die, said oscillation serving to move the particulate molding material about in the mold cavity, distributing it between the die surfaces forming the wall of the cup being molded.

6. A molding device comprising a frame, a complementary pair of dies, the first defining primarily the inside and the second primarily the outside of a cup-shaped article of revolution, means for mounting said dies on said frame for closing and opening movement, in a straight line, toward and away from each other and means for oscillating at least one of said dies about the axis of closing, during the closing operation.

References Cited in the file of this patent

UNITED STATES PATENTS

| 1,198,874 | Sloper | Sept. 19, 1916 |
| 1,637,708 | Porter | Aug. 2, 1927 |
| 1,682,359 | Straub | Aug. 28, 1928 |
| 2,251,858 | Snell | Aug. 5, 1941 |
| 2,583,441 | Palmer | Jan. 22, 1952 |
| 2,899,708 | Donaldson et al. | Aug. 18, 1959 |
| 2,951,260 | Harrison et al. | Sept. 6, 1960 |
| 2,971,223 | Grunin et al. | Feb. 14, 1961 |
| 3,004,285 | Hagen | Aug. 17, 1961 |
| 3,030,668 | Taylor | Aug. 24, 1962 |

FOREIGN PATENTS

| 162,262 | Great Britain | Dec. 19, 1921 |

OTHER REFERENCES

Ser. No. 337,674 (abandoned), Schmidberger (A.P.C.), published Apr. 27, 1943.